Nov. 23, 1965  J. R. GUINGAND  3,219,327
HEATING AND HEAT TREATMENT FURNACE FOR
METAL PRODUCTS AND INGOTS
Filed Feb. 4, 1963  3 Sheets-Sheet 2

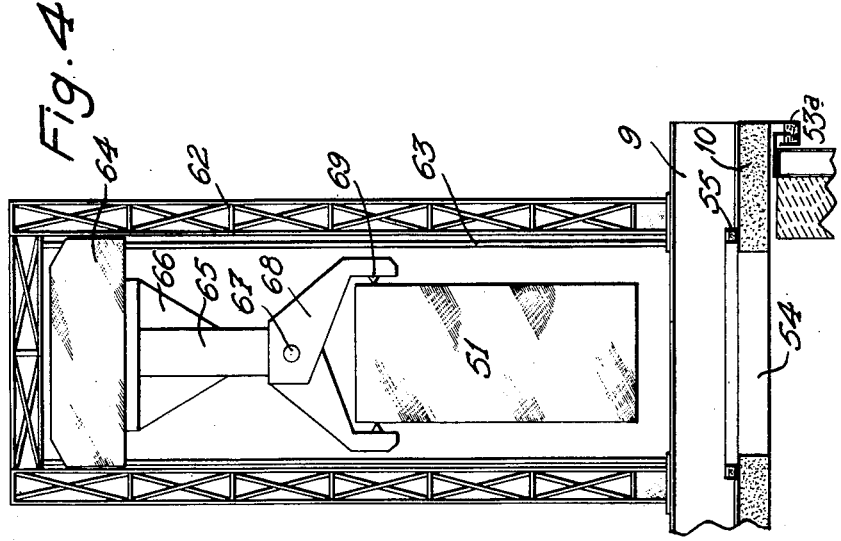
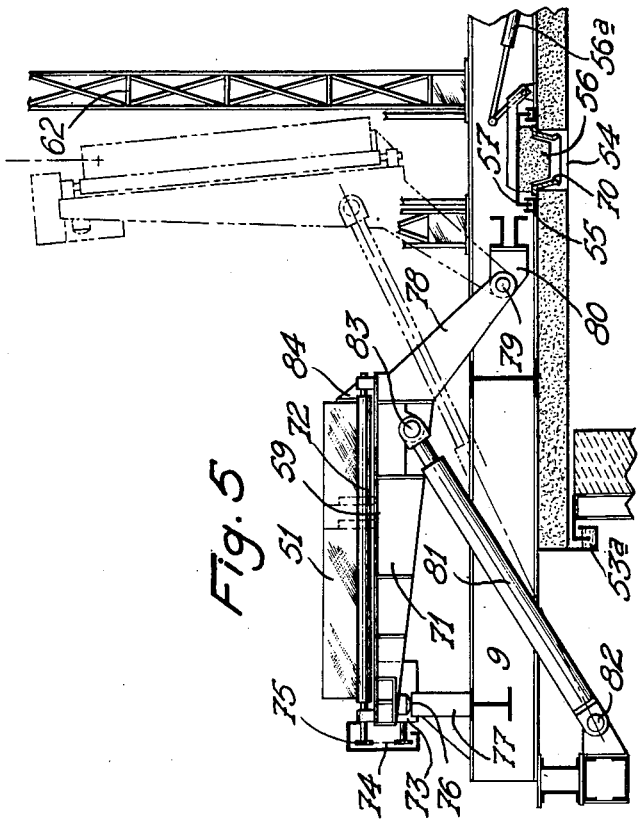

United States Patent Office 3,219,327
Patented Nov. 23, 1965

3,219,327
HEATING AND HEAT TREATMENT FURNACE
FOR METAL PRODUCTS AND INGOTS
Jean Raymond Guingand, Paris, France, assignor to
Societe Anonyme Heurtey, Paris, France
Filed Feb. 4, 1963, Ser. No. 256,077
Claims priority, application France, Feb. 5, 1962,
886,910, Patent 1,321,463
6 Claims. (Cl. 263—7)

This invention relates to a heating and heat treatment furnace for metal products and notably for ingots, with particular reference to aluminum and aluminum alloy plates.

Such a furnace is primarily designed for the treatment of such metallic products, and more particularly for rendering plates of different sizes and types homogeneous in readiness for rolling.

A furnace according to this invention is provided with a rotary hearth at the center of which is fixedly disposed a heating and forced circulation system which is arranged symmetrically within the furnace atmosphere, said hearth being provided with radially arranged screens which bound likewise radial cells for reception of a variety of products, the roof of said furnace being provided, for example, with a door for axial passage of said products, which door is as small as possible and preferably permits the passage of a single unit of the product only, and finally there is provided associated hoisting means.

To ensure powerful convection, recourse is had to a very high capacity ventilation system in conjunction with preferably adjustable annular deflectors.

Said ventilation is preferably designed to be cyclically reversible.

The assembly consisting of the fan and its support forb, in the stationary parts of the furnace, a unit which is positioned removably in the central area of the furnace roof, said roof being stationary.

Beneath said assembly is placed the heating device comprising a set of burners located within a sationary internal hearth, which hearth is surrounded by a cylindrical separating partition which rests on said hearth on a castellated base and the upper edge of which is spaced from the roof and has fitted thereinto an annular duct surrounding the fan blades.

Within said partition is coaxially placed a guiding barrel-plate supported by spacing struts and flared downwardly to face the burner ports.

The mobile parts of the furnace comprise an annular hearth which is preferably rigid with the outer wall of the furnace, said annular hearth being provided with seals with respect to the stationary central hearth and the peripheral area of the roof.

Through the medium of a double chassis (ribbed shielding and anti-friction supporting base), said hearth rests upon circular rolling tracks, the rolling members being associated with circular centering and guiding means in conjunction with a driving rack, which circular guiding means bears against rollers having elastically mounted axles.

Said rack cooperates with a driving motor-reduction gear unit and possibly with indicating means for detecting the angular position of said hearth.

Such a furnace is especially well suited to operation with an automatically triggered cycle.

In further accordance with the invention there is provided an ingot handling system in combination with a furnace of the above type, which system includes a substantially horizontal stored-ingot conveyor which travels past a tripping device which is adapted to erect a prone ingot, and vice versa, and is positioned between said conveyor and an elevator equipped with ingot loading or unloading tongs, which elevator overhangs the passageway opening in the furnace roof, said opening being in turn provided with a sealed door which is retractable in response to convenient actuating means.

With such a handling system, the conveyor elements are preferably of the driven or non-driven roller type.

The means for actuating the tipper, the tongs-equipped elevator, the bits of the tongs, and the door, are preferably jacks. Said jacks can easily be integrated into an overall actuation pattern by means of a programming mechanism set in operation by triggering means.

With such an arrangement it is possible to ensure heating and rapid and regular homogeneization to ensure high production rates. It also allows for placing the charge and discharge controls of one or more furnaces of the same type within a roller's control desk, the function of the latter being to cause a given ingot to be withdrawn and conveyed to the rolling-train and a cold ingot to be then introduced in place of the one just extracted.

The description which follows with reference to the accompanying drawings, which are provided by way of example only and not limitation, will give a clear understanding of how the invention can be carried into practice.

In the drawings filed herewith:

FIG. 4 is a schematic front elevation view of a tongs-type elevator for handling ingots; and FIG. 5 is a fragmentary cross-sectional view in side elevation, of an ingot tipper.

Figure 1:
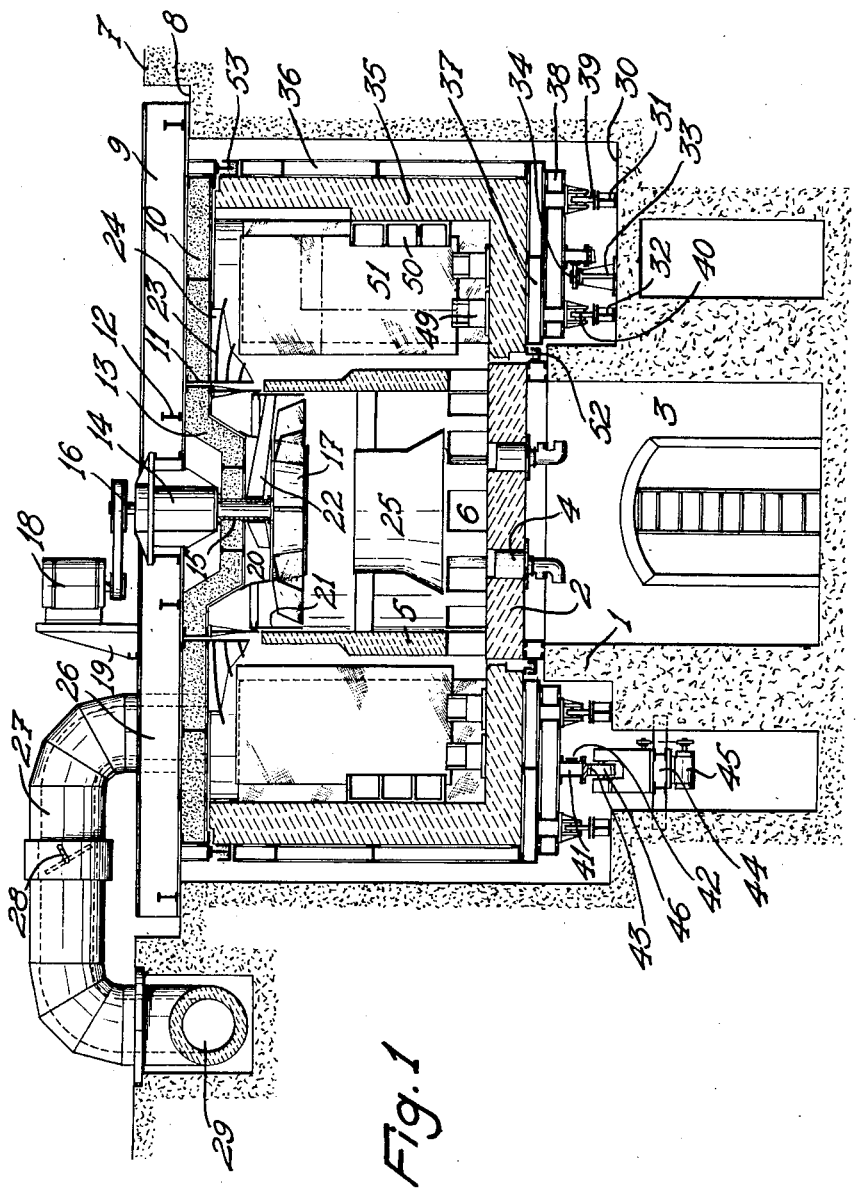
FIG. 1 is an axial sectional view of a furnace in accordance with this invention.
Figure 2:
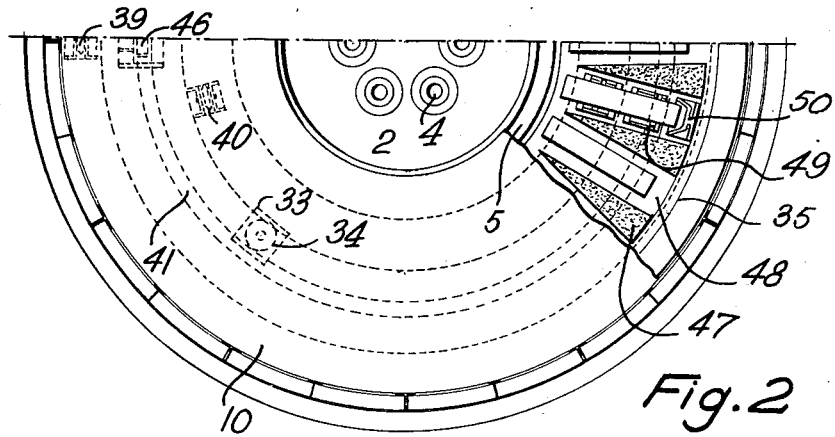
FIG. 2 is a half plan view, with partial cutaway, of the furnace of FIG. 1, the ventilation system being removed for purposes of clarity.

The furnace illustrated in the drawings comprises, on a portion which is raised above the foundation 1, a stationary circular hearth 2 surmounting an inspection chamber 3. Said stationary hearth is provided with burners 4 arranged in a uniform circle. Upon stationary hearth 2 is placed a cylindrical partition wall 5 the base of which is castellated, whereby to form apertures 6.

At ground level 7, the foundation work supports, upon a shoulder 8, an arrangement of criss-crossing ribs 9 from which are dependent the overhead travelling cranes and mechanical handling devices to be described hereinafter, the lower part of this framework of ribs supporting the fixed annular furnace roof 10. Said roof 10 is made of shielding material in conjunction with a light insulating filler.

To the ribs 9 are connected further ribs 12, from which is dependent a circular obturator 13 which has a central recessed portion and is inserted into said central opening 11.

In the centre of recess 13 is placed a bearing 14 extended by a sealing gland 15 through which passes the shaft 16 of a circulating fan 17 contained within the furnace. The upper extremity of shaft 16 is fitted with a pulley over which runs a system of belts for driving fan 17, the driving power being supplied by a motor 18 supported on a saddle 19 mounted on ribs 9. An enclosure 20 is suspended from the bowl-shaped recess 13, while shaft 16 and its ancillaries are cooled.

The fan blades are surrounded by a duct 21 carried on supporting struts 22 the tops of which are provided with a reinforcing rib. Said duct 21 is a sliding fit into the upper end of cylindrical partition 5 and projects slightly above the upper edge thereof. This arrangement provides for an annular space between roof 10 and the upper edge of partition 5. At the periphery of said partition, within the annular space, are disposed circular streamlined and adjustable guides 23 which are supported by radial gussets 24 dependent from fixed roof 10.

In the space bounded by cylindrical partition 5 is dependent from streamlined struts or supported on suitable legs a barrel-plate 25 the upper portion of which is generally cylindrical in shape and the lower portion flared to encompass the jets issuing from burners 4. Said barrel-plate has one end facing fan 17 and another end facing the stationary hearth 2 at a location above the apertures 6.

In the fixed roof 10 is provided a smoke discharge orifice 26 connected to a lagged conduit 27 which is equipped with an adjustment register 28 and joined to a smoke discharge flue 29 leading into a smoke stack or any other intermediate utilization system.

The foundation-work embodies an annular platform 30 upon which is placed a pair of circular rolling tracks 31 and 32. Likewise disposed thereon are regularly spaced heads 33, each of which supports a guiding roller 34 having a preferably elastically mounted axle.

The annular rotary hearth comprises insulating and refractory masonry 35 of outwardly decreasing density and of generally L-shaped section, and this heat insulating material rests upon a ribbed shielding 36 of like shape. The annular bottom 37 of said shielding rests upon a likewise annular chassis 38 the framework of which supports two circular rows of wheels 39 and 40 running on the tracks 31 and 32. Dependent from chassis 38 is a circular rib 41 which is provided with an inner strip 42 adapted to bear against the rollers 34 and, beneath said strip, with a circular rack 43.

Fixedly mounted on an auxiliary support 44 is a sunken motor/reduction gear unit 45 which drives pinion 46 meshing with rack 43.

Within annular hearth 35 are disposed arcuate refractory and insulating screens 47 bounding successive cells 48. The base of each cell is provided with channel-shaped supports 49 having a bearing surface and outwardly opening flanges. Similarly, the inner cylindrical wall of hearth 35 is provided with identically shaped supports 50, which supports are made of hard and refractory material and are adapted to receive the ingots to be treated 51, whereby to ensure that said ingots are precisely positioned and held in perfectly stable fashion notwithstanding the acceleration forces set up by the motion of the rotary hearth.

In the case of relatively moderate heat treatment, temperatures not exceeding 550 to 620° C. for the heating and homogenization of, for instance, ingots made of aluminum or alloys thereof, the screens 47 can consist of refractory steelplate envelopes used in conjunction with a mineral wool packing. Said screens extend upwardly from the flat annular part of the hearth and stop short of the roof 10, the space between the tops of the screens and the roof being occupied by the snouts of deflectors 23.

Since said screens bound individual insulated cells, a cold ingot 51 can be introduced into the furnace without affecting the ingots in adjacent cells which may be hot or undergoing heating.

Sealing at the junction between the annular portion of rotary hearth 35 and the periphery of stationary hearth 2 is ensured by a circular seal 52. The junction between the upper edge of the side wall of hearth 35 and the periphery of roof 10 is provided by a leaktight seal 53. Seal 52 is protected beneath steps on the rotary hearth. Where sand-type or like seals are used, it is of little importance whether the groove receiving the sand is stationary or mobile. However, in the case of a hydraulic joint, it will be of advantage to utilize a stationary groove, as shown in FIG. 1 for seal 52 and in FIG. 5 for seal 53a, in order to facilitate the connections to the sealing liquid inlet and outlet ducts. When this is the case, the mobile part supports the downwardly extending skirt.

As can be more clearly seen on FIGS. 4 and 5, roof 10 is provided with an aperture 54 rimmed with a seal 55 and adapted to be covered by a hinged door 56 surrounded by a sealing skirt 57. Only one such door is preferably provided, and is as small as possible to reduce the heat losses to a minimum when it is open.

From the thermal point of view, operation of such a furnace is as follows:

The cells 48 receive the ingots to be treated, and to this end hearth 35 is moved step by step in order to place each cell in turn opposite aperture 54. The same applies when it is desired to withdraw one of the ingots.

Regardless of the motions of this hearth, heating is ensured symmetrically with respect to the furnace axis and in steady and homogenous fashion by the burners 4, the jets from which are oriented upwardly into the interior of partition 5 and barrel-plate 25.

When fan 17 rotates in a certain direction, the smoke is driven in the direction of deflectors 23 and sweeps across each cell 48 and the ingot contained therein before being recycled by passage thruogh the apertures 6 back towards the flames of burners 4. A regulated portion of the smoke output is discharged through conduit 27, the pressure inside the furnace being adjusted by means of register 28.

The direction of rotation of fan 17 is cyclically reversed. Under such conditions, the burner jets passing through and into barrel-plate 25 are deflected downwardly between said barrel-plate 25 and partition 5, are driven towards the ingots through the apertures 6, pass through the cells 48 in ascending fashion and return beneath the deflectors 23 towards the upper area of the fan blades, from which they derive their impulse.

Heating conducted in this manner is homogeneous, and the internal temperatures of the ingots are rapidly equalized both in the inner and outer sections and from top to bottom.

Operation of such a furnace is very flexible from the thermal point of view, since its internal temperature can be automatically adjusted and stabilized.

Finally, very great rapidity of treatment is ensured. From the mechanical handling standpoint, such a semi-continuous furnace can be associated with cold-ingot-reverse conveyors and with hot ingot conveyors, particularly in cases where a rolling-mill is to be fed. These conveyors are themselves associated with a system of erectors and flatteners which cooperate with an elevator equipped with tongs for loading and unloading the products to be treated.

Figure 3:
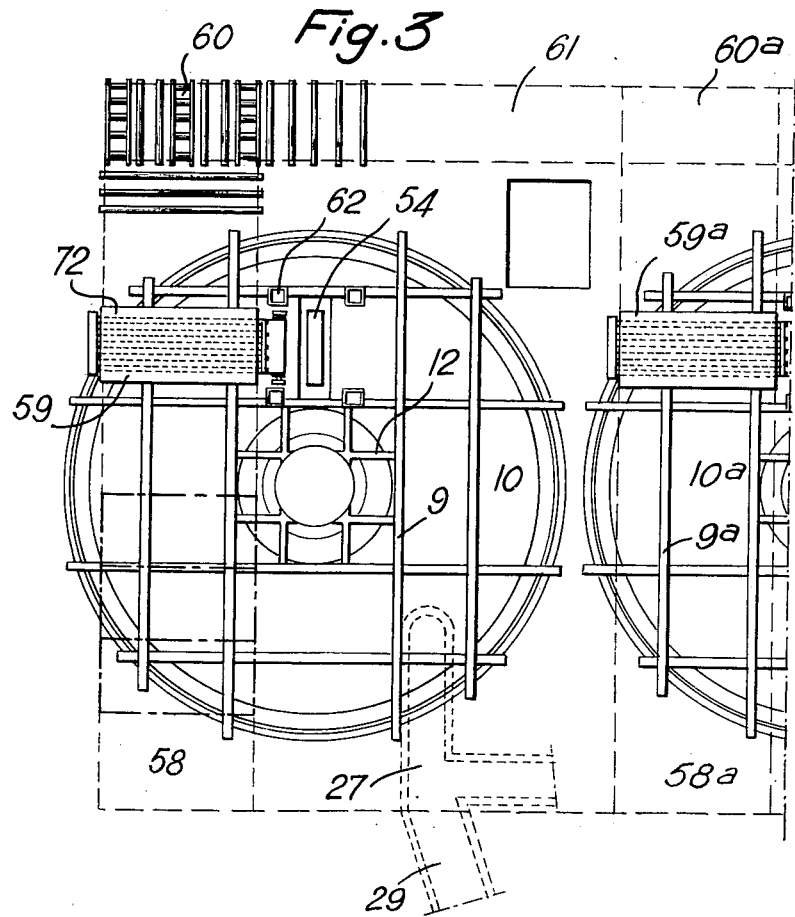
FIG. 3 is a diagrammatic plan view of such a furnace and gives a fragmentary representation of a mechanical handling system extending to an associated furnace, which furnace is likewise shown in fragmentary fashion.

As shown in FIG. 3, the framework 9 is accordingly designed to support a reserve ingot conveyor 58, in the path of which is interposed an erecting and flattening table 59. FIG. 3 shows an installation comprising two furnaces, and framework 9a of the second furnace is similarly designed for association with a similarly laid-out reserve ingot conveyor 58a. The two conveyors lead up to direction-changing devices 60 and 60a which are interposed in a conveyor 61 for discharging the products into a rolling shop.

The locations of conveyors 58 and 58a and tables 59 and 59a are so determined that each table 59 be positioned near the opening in the corresponding door 54 or 54a. Each of these openings is surmounted by an elevator shaft comprising four uprights 62 designed to guide an associated pair of tongs for vertical manipulation of the ingots.

As may be clearly seen in FIG. 4, the shaft uprights 62 are provided with guideways 63 along each of which slides a mobile part 64 in response to appropriate hoisting machinery (not shown). From the bottom of said mobile part is dependent a rigid column 65 which is cross-braced by reinforcements 66, and the bottom of said column supports the pivot 67 for the self-tightening bits 68 of the pair of tongs, which bits can be actuated in addition by a preferably hydraulic double-acting jack (not shown).

The facing portions of bits 68 are provided with points 69 for digging into the sides of the ingots being handled.

It is important that the alignment of guideways 63 and of the guidance path of mobile part 64 be very accurate, to ensure that the ingots 51 enter smoothly into the chute 70 surrounding aperture 54, so as to avoid accidents. This guidance function results in each ingot 51 being very accurately deposited on the supports 49 and against the supports 50. The hoisting machinery is additionally provided with adjustable limit switches which are set according to the dimensions of the ingots to be charged or discharged, and these adjustments can be set to suit demand since a given furnace charge can include ingots of different types.

Since it is preferable for ingots conveyed along substantially horizontal tracks to lie flat on their largest face, the necessary transposition is effected by a table 59.

Such a table comprises a member 71 which supports self-driving rollers 72 driven by a motor/reduction gear unit 73 mounted on the ends of the rollers and driving the same through a chain 74 which runs over all the end sprockets 75. When table 5 is in the prone position, rollers 72 are substantially horizontal.

Through the medium of an adjustable stop 76, the prone table rests upon a pad 77 rigid with the ribs 9.

At its other extremity, member 71 is provided with a fork 78 pivoted onto a horizontal shaft 79 carried in supports 80 rigid with the ribs 9. Said fork 78 is angled out of the horizontal plane.

The table is erected by means of a jack 81, one end of which is pivotally connected at 82 onto a support rigid with ribs 9 and the other end pivotally connected at 83 beneath table 59. Extension of the jack results in erection of the table (shown in dotted lines in FIG. 5), while retraction thereof results in the table being lowered into horizontal position.

Near the end of table 59 which is closest to pivot 79 are provided adjustable packing pieces 84 adapted to receive the lower edge of an ingot. These packing pieces are adjustable according to the transverse dimensions of the ingot, to ensure that the upper edges of the latter are always presented at the same elevation and can therefore be engaged at a constant level by the tongs 68. The packing pieces 84 are accordingly displaceable between the rollers 72 along slideways, in response to an actuator mechanism (not shown). Intermediate positions of said packing pieces are shown in dotted lines on the figure.

In operation, an ingot taken up on conveyor 58, subsequent to retraction of the retaining chocks (not shown), can be pushed onto table 59, where it is held stationary by the braking motor, for instance, of rollers 72. Table 59 is then tilted and penetrates into elevator shaft 62.

To ensure stability of the ingot in this posture, its place of engagement by the points 69 of the tongs lies in the longitudinal symmetry plane of aperture 54, along which plane said points move during movement of the elevator. Conversely, the lower edge of the ingot is spaced from said plane, so that the tongs 68 close on to the ingot when it is held obliquely in this manner.

The tongs are first raised slightly to disengage the packing pieces 84, after which the table is pivoted into the flat position so that the ingot is vertically suspended by the tongs after the ingot has swung slightly around the aligned and tightened points 69.

The ingot is then lowered into an empty cell in hearth 35, through the door 56 which is opened momentarily by actuating jack 56a. Once the ingot is resting on supports 49 and 50, the tongs 68 are opened and raised, and the door is closed.

After suitable positioning of hearth 35, which brings an ingot to be withdrawn beneath the door, the tongs 68 can be lowered into the furnace and clamped onto the treated ingot, after which the latter can be raised. The reverse sequence of operations is then applied to the table, which is flattened once more after the ingot has been deposited. The rollers 72 are then set in operation in order to move the hot ingot onto conveyor 61.

These powered operations can be controlled manually if desired, with rotation of the hearth 35 displayed by a convenient indicator (not shown). The operations as a whole can alternatively be subordinated to a programmed machine, the triggering members of which can moreover be remotely located, for instance in the control cabin of a rolling-mill operator.

It is of course to be understood that many modifications can be made to the specific embodiments hereinbefore described, without departing from the spirit and scope of the invention.

What I claim is:

1. Apparatus for heat treating ingots by means of a semi-continuous furnace having a rotary hearth heated from the center of said hearth, said apparatus comprising an annular rotatable hearth, stationary wall elements surmounting said hearth and a cylindrically shaped stationary partition in said hearth coaxially disposed with respect thereto, said hearth, said elements and said partition defining an annular space for the accommodation and the treatment of said ingots, means defining a plurality of centrally open cells in said space arranged in a circle coaxial with said hearth, means inside said partition for supplying heated gases thereto, circulating means for circulating the heated gases disposed inside said partition, means establishing a passage for said gases at the top and at the bottom of said partition, radial screeens on said hearth and adjacent said centrally open cells for thermally insulating said centrally open cells from each other, a single door in the stationary wall elements for passage of said ingots to and from said cells, and mechanical handling means adapted for engaging and passing said ingots through said door when the latter is open.

2. Apparatus as claimed in claim 1, comprising annular deflectors situated in said annular space in the vicinity of said passage at the top of said partition.

3. Apparatus as claimed in claim 2, wherein said circulating means includes reversing means for reversing the direction of the flow of gases in said partition.

4. Apparatus as claimed in claim 3, wherein said means for supplying heated gases inside said partition comprises a set of parallel burners, a bottom fixed plate centrally disposed in said annular hearth and supporting said burners as well as said partition, a removable circular obturator in one of said wall elements constituting a top wall for said furnace, said circulating means comprising a fan in said partition, driving means for said fan, said centrally disposed obsturator supporting said driving means for the fan, said fan being internally disposed within said partition above said set of burners, and a barrel-plate coaxially disposed within said partition at a distance from said partition and above and at distance from said burners.

5. Apparatus as claimed in claim 1, wherein said annular hearth includes an annular bottom, cylindrical external masonry integral with said bottom and defining an external wall for said furnace, and first sealing means respectively disposed near the top of said masonry on the periphery of said wall elements which forms a ceiling for said space, and second sealing means at the internal edge of said rotary hearth.

6. Apparatus as claimed in claim 1, wherein said handling means comprises a conveyor for ingots to be treated, a pair of tongs adapted for introduction and extraction of said ingots through said door, tilting means adapted for pivotally raising and subsequently lowering said ingots on said conveyor, said tilting means having a slight inclined position in the raised position with respect to said tongs, and adjustable packing pieces on said tilting means adapted to bring said ingots in a raised position into a prescribed elevational position with respect to said tongs.

(References on following page)

References Cited by the Examiner

UNITED STATES PATENTS

| | | | |
|---|---|---|---|
| 1,638,908 | 7/1926 | Baker | 263—7 |
| 1,923,145 | 1/1931 | Harsch | 266—5 |
| 1,938,306 | 12/1933 | Webb. | |
| 2,467,746 | 4/1943 | Hess | 263—7 |
| 2,486,506 | 5/1946 | Sylvester | 263—7 |
| 2,792,211 | 9/1952 | Kennedy | 263—7 |
| 3,063,878 | 11/1962 | Wilson | 266—5 X |
| 3,097,836 | 7/1963 | Beggs et al. | 263—41 |

FOREIGN PATENTS 7,203   3/1912   Great Britain.

WILLIAM F. O'DEA, *Acting Primary Examiner.*

CHARLES SUKALO, *Examiner.*